Aug. 17, 1937.          J. W. CONKLIN ET AL          2,089,994
FLASH-BACK INDICATOR FOR MERCURY RECTIFIER TUBES
Filed Jan. 10, 1934          2 Sheets-Sheet 1

INVENTORS
JAMES W. CONKLIN
CLARENCE W. HANSELL
BY
ATTORNEY

Aug. 17, 1937.  J. W. CONKLIN ET AL  2,089,994
FLASH-BACK INDICATOR FOR MERCURY RECTIFIER TUBES
Filed Jan. 10, 1934  2 Sheets-Sheet 2

INVENTORS
JAMES W. CONKLIN
CLARENCE W. HANSELL
BY
ATTORNEY

Patented Aug. 17, 1937

2,089,994

UNITED STATES PATENT OFFICE 2,089,994

FLASH-BACK INDICATOR FOR MERCURY RECTIFIER TUBES

James W. Conklin and Clarence W. Hansell, Rocky Point, N. Y., assignors to Radio Corporation of America, a corporation of Delaware Application January 10, 1934, Serial No. 706,018

8 Claims. (Cl. 177—311)

This invention relates to a flash-back indicator which is particularly adapted for registering flash-back failures in high voltage mercury arc rectifiers.

An object of this invention is to provide a simple and improved electrical indicating device.

Another object of this invention is to provide a flash-back indicating device which employs but a few inexpensive component parts, each of the separate component parts specifically performing several functions wherever possible.

Another object of this invention is to provide an improved flash-back indicator which does not employ the use of pivots which are common to most all polarized relays or indicators, all of the prior art indicators having one or more pivots in their general construction.

A feature of this invention is the simplicity with which the indicator may be connected and assembled to existing rectifying apparatus.

Another feature of this invention is the adoption of auxiliary contacts to be opened by the falling of a visual indicator for the purpose of operating auxiliary alarm or control circuits which may be remotely located.

Rectifier tubes as used for supplying direct current in high voltage circuits employing the hot cathode mercury vapor type tubes such as the UV-869A are subject to occasional failures commonly termed flash-backs or arc-backs, in which the tube breaks down and becomes conducting in a direction reverse from the desired normal direct current flow. When such breakdowns occur the tube constitutes practically a dead short circuit on the remainder of the rectifier, causing an excessive overload in the circuit, and frequently results in failures of the radio transmitter. When such tubes are subjected to flash-backs they may or may not display any visual indications which will enable an operator to readily be aware of such an occurrence.

The purpose of this invention is to furnish means by an improved type of flash-back indicator to identify immediately the tube or tubes in which flash-back has occurred. The current flowing through two rectifier tubes during the moment of flash-back, as mentioned above, are of excessive magnitude, and of the same order as those occurring with an external flash-over in the rectifier circuit, and are similar in nature to those occurring in a power amplifier flash-over. They are differentiated however from the normal overload currents in that the direction of the direct current flow in the faulty tube is reversed from the normal rectification currents.

The requirements therefore for a satisfactory flash-back indicator are that they should indicate only at the moment of excessive currents in a reverse direction and shall be capable of carrying the normal rectification current also any momentarily external overload currents without visual indication or damage to the rectifier tube.

The visual indicator member of this invention is a red painted rod-like member normally held out of sight within a tube by a permanent magnet.

A more complete understanding of this improved indicator will be had by referring to the accompanying drawings, in which, Fig. 1 shows a fundamental circuit of the magnetic action of the indicator when the current is flowing in the normal direction;

Figure 1:
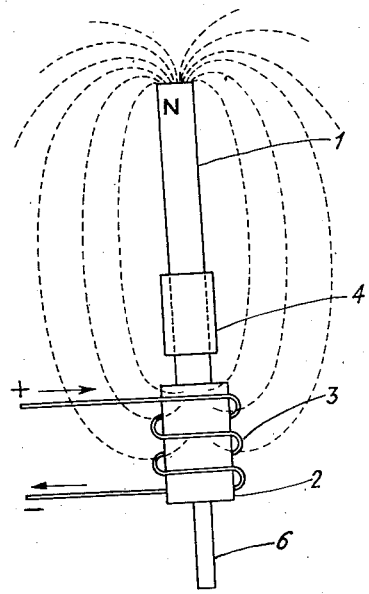
Figure 2:
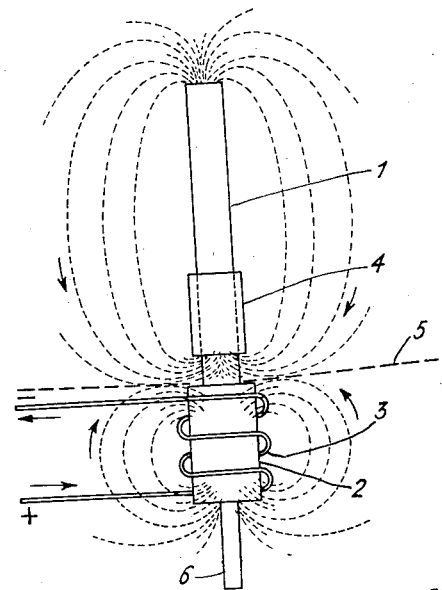
Fig. 2 shows a diagram of the magnetic action of the indicator when the current is flowing in the reverse direction.

Referring now to Figs. 1 and 2 which indicate the fundamental magnetic circuit and upon which principle the indicator works, 1 indicates a permanent magnet rod of cobalt-chrome steel magnetically supporting a soft iron armature 2 having a depending or visual indicating rod portion 6 held to magnet 1 against gravity, the armature 2 being enclosed within a solenoid comprising a coil 3 of a few conductor turns which is serially connected in the operating circuit. In the normal operation of the rectifier circuit the coil 3 will magnetize the soft iron armature 2 with the same polarity as the permanent magnet 1, causing the armature 2 to be held tightly to the magnet 1. When currents flow in the reverse direction, such as occurs in a flash-back, there is set up a reverse polarity in the iron armature 2, causing it to oppose the permanent magnet and force the armature away from the magnet 1. The lower end of the magnet 1 is surrounded by a short circuited turn in the form of a copper sleeve 4 which supplies a time lag to the current flow and opposes any rapid change of the flux flowing through the permanent magnet 1. The action of this short circuited turn being two-fold in that it serves to momentarily maintain the polarity of the permanent magnet against the action of the solenoid 3 and prevents any demagnetization of the permanent magnet caused by high reverse currents in the solenoid.

Fig. 1 shows the approximate conditions of the magnetic flux and the current in the normal direction, and it will be noted that the flux is substantially continuous through the armature and magnet.

In Fig. 2 there is shown the conditions existing when the momentarily reverse current has just been applied, and it will be noted that there are two opposing fields set up, one being produced by the solenoid 3 and the armature 2, and the other field being that of the permanent magnet. It is also to be noted that when a normal field exists at the junction of the two fields, as indicated by the dotted flux line 5 shown only in Fig. 2, during the duration of the reverse current this neutral field progresses gradually upward as the solenoid field gradually overcomes the effect of the short circuited turn 4. When a neutral field approaches the division point between the armature and the permanent magnet, the magnetic forces tending to hold the two elements together will be momentarily weakened and the armature released. When the armature is released it drops by the action of its own weight assisted by the action of the solenoid attempting to centralize the armature within itself. Once the armature is released from the magnet 1 and dropped beyond the influence of the forces of the permanent magnet field 1 the magnetic force of the permanent magnet is no longer sufficient to raise it, and the indicator or depending rod portion 6 remains in this lower or dropped position until the circuits have been corrected and the armature 2 manually reset.

Figure 5:
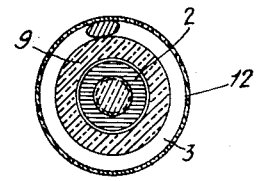
Fig. 5 is a cross section of Figs. 3 and 4, the section being taken on lines A—A of Fig. 3.
Figure 4:
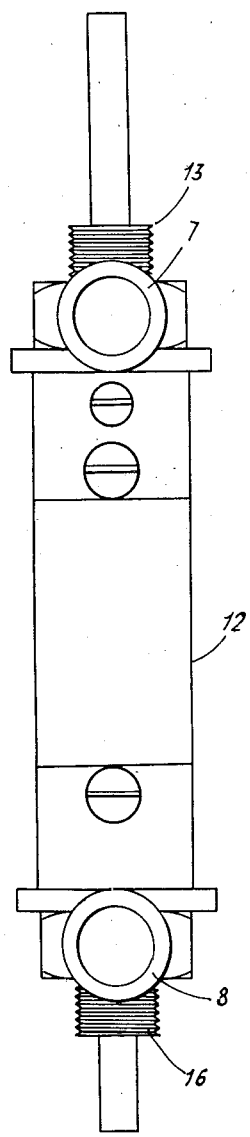
Fig. 4 is an elevation of Fig. 3.
Figure 3:
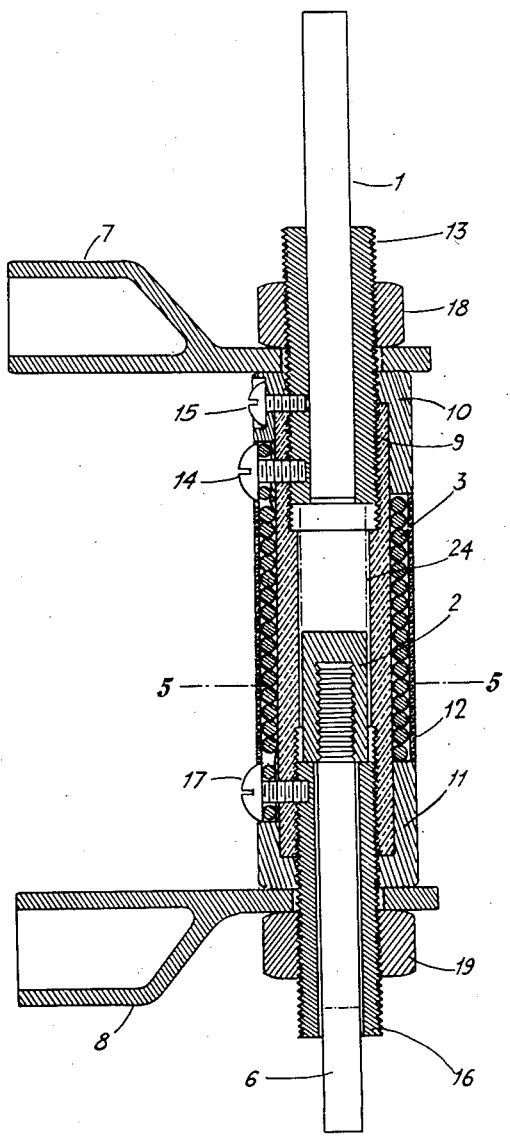
Fig. 3 is a vertical longitudinal section of the indicator.

Referring now to Figs. 3, 4 and 5, there is shown the general mechanical assemblage of the various component parts. The unit is normally mounted in a convenient position adjacent to the rectifier tube and connected directly in series with the plate or cathode lead of the rectifier tube by means of terminal lugs 7 and 8. Interposed between the terminal lugs there is retained a tubular insulating housing 9 having end terminal and closing members 10 and 11. Surrounding the insulating member 9 there is wound the copper solenoid 3 which is serially connected between end terminals 10 and 11. Located in the upper portion of the unit there is retained a threaded copper tube 13 which is secured to the end terminal member 10 by means of a screw 14. Within the member 13 there is located the permanent magnet rod 1, the location of the magnet within the member 13 being determined when the flash-back indicator is adjusted in the circuit by means of clamping or set screw 15. Directly below the magnet 1 there is located the soft iron armature 2 which is threaded to receive the depending indicating rod portion 6, preferably composed of insulating material such as bakelite. The lower end of the indicating rod portion 6 is painted red, as indicated by the dash and dot line. The solenoid 3 is covered by an insulating member 12. The armature is movably located within a lower copper tube 16 which is similar to member 13 and is retained within the insulating housing 9 by means of a suitable screw 17, the whole assemblage being retained between the terminal lugs 7 and 8 by means of clamping nuts 18 and 19.

In another method of mounting the indicating device the terminal lugs 7 and 8 may be dispensed with and the entire unit retained by a pair of standard cartridge fuse clips which are mounted on a suitable panel. By this modification of mounting several different indicating devices having varied electrical characteristics may be quickly interchanged.

Figure 6:
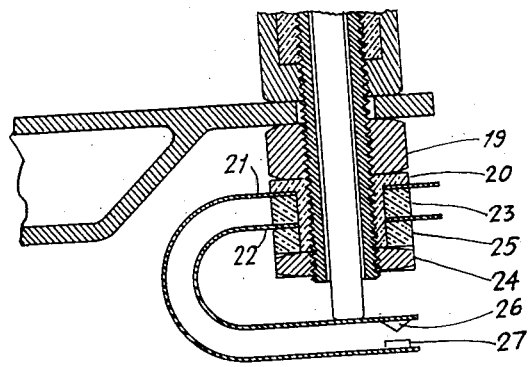
Fig. 6 is a section of the lower part of Fig. 3 showing an arrangement of auxiliary contacts.

In Fig. 6 there is located directly below the clamping nut 19 an insulating bushing 20 which retains a contact member 21. There is also located on bushing 20 a similar contacting element 22 which is spaced apart from contact spring 21 by means of an insulating washer 23 and clamped by means of a nut 24, the nut 24 being insulated from the contacts by means of an additional washer 25. The extreme or free ends of spring contact members 21 and 22 are provided with suitable contacting material such as silver or tungsten points 26 and 27.

Figure 7:
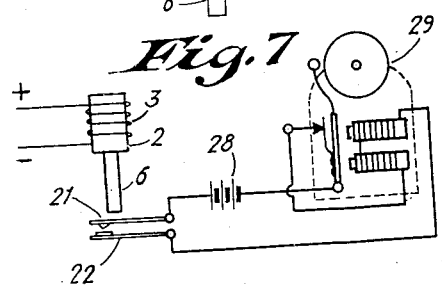
Fig. 7 is a circuit diagram of the auxiliary contacts as shown in Fig. 6.

In the circuit shown in Fig. 7 the contacts 21 and 22 are shown connected to a suitable battery 28 which is arranged to operate a bell 29 or any other indicating device upon the closing of the circuit by means of contacts 21 and 22.

In the adjustment of this improved flash-back indicator the magnet 1 is normally held permanently in place by the set screw 15 in the end terminal member 10. The set screw 15 is loosened only when adjusting or removing the magnet. Normal adjustment of the magnet is with its inner pole just flush with the inner end face of the upper tube 13 and making contact with the iron armature 2. This adjustment may be obtained by holding the unit inverted and pushing in the magnet until it just starts to raise the plunger or by forcing the magnet in until it moves the plunger and then pushing it back to to its normal position. This may be accomplished by applying pressure on the plunger with a special tool. The north end of the magnet which is preferably associated with the upper terminal, should point in the direction of the positive terminal of the unit for the normal flow of current.

The sensitivity of the indicator may be increased by withdrawing the magnet into the tube 13. However, such adjustments are uncertain as to their accuracy. The magnet 1 should be just strong enough to support three or four times its own weight of iron from one pole. If the permanent magnet should become weak its field strength can be very easily replaced by remagnetizing, or it may be remagnetized by forcing a momentary current of several hundred amperes through the coil 3 in a direction of the normal rectification current, any ordinary 6-volt direct current potential being satisfactory for this purpose. This large amount of current should be maintained only for an instant as a longer period of time will overheat the solenoid and thus damage its insulating qualities. Therefore, it is better whenever practical to remove the magnet and remagnetize it by any suitable external remagnetization method.

A number of indicators tested in actual circuit operation showed that when occasionally they were demagnetized by excessive arc-backs, normal circuit operation of the indicator restored the magnetism without further attention.

While I have described only one specific use for this invention, it is distinctly understood however, that this indicator is capable of uses in other circuits, and therefore the invention should not be limited except as imposed by the appended claims.

What we claim is:

1. An electrical device to be used as an indicator for the direction of a desired normal current flow comprising a permanent magnet partly located within an insulating tube, a single short-circuited turn of metal acting as a coil surrounding the lower portion of said permanent magnet, a movable armature within said insulating tube, a multi-turn solenoid surrounding said armature, said armature normally being magnetically retained and located at the lower portion of said permanent magnet, a visual indicator secured to the lower portion of said armature, the lower portion of said visual indicator extending beyond said insulating tube when a reversed direction of the desired normal current flows through said solenoid.

2. An electrical device to be used as an indicator for a normal current flow comprising a permanent magnet located within an insulating tube, a single short-circuited turn of copper acting as a coil and surrounding the lower portion of said magnet, a movable soft iron armature within said insulating tube, a multi-turn solenoid surrounding said armature, said armature normally being magnetically retained by and located at the lower portion of said permanent magnet, a visual indicator secured to said armature and arranged to externally appear beyond the lower portion of said insulating tube when a reversed direction of the desired normal current flows in said solenoid.

3. An electrical device to be used as an indicator for the direction of desired normal direct current flow comprising a permanent magnet, a single short-circuited turn of metal acting as a coil surrounding the lower portion of said magnet, an insulating tube surrounding said magnet, a movable armature retained by and located at the lower portion of said permanent magnet, a multi-turn solenoid surrounding said armature and wound outside of said insulating tube, said solenoid located below said permanent magnet within the confines of said armature, a visual indicator secured to the lower portion of said armature and arranged to extend beyond the insulating tube when the normal flow of a desired direct current flows in a reversed direction through said solenoid.

4. An electrical device to be used as an indicator of the normal flow of direct current comprising a permanent magnet, a short-circuited turn of metal acting as a coil and surrounding the lower portion of said magnet, an insulating tube partly surrounding said magnet, a multi-turn solenoid wound outside of said insulating tube and located below said permanent magnet, an armature located within said tube and retained within the confines of said solenoid by the magnetic attraction of said permanent magnet, a lug attached to each end of said insulating tube for connecting the solenoid of the indicating device in a circuit, a visual indicator secured to the lower portion of said armature and arranged to appear beyond said insulating tube when the normal desired flow of current through said solenoid is reversed.

5. A device to be used as an indicator for the normal flow of desired direct current comprising a permanent magnet the lower portion of which is surrounded by a single short-circuited turn of metal acting as a coil, an armature normally held directly below said magnet by the magnetic attraction of said permanent magnet, a single layer coil surrounding said armature and located below said short-circuited turn, indicating means attached to said armature comprising a rod-like member the lower portion of which visually indicates when the normal flow of the desired direct current is reversed in said single layer coil.

6. An electromagnetic device of the pivotless type for indicating a desired normal direction of current flow comprising an insulating tube, a magnetic coil surrounding said insulating tube, a metallic cap secured to both ends of said tube, each of said caps being electrically connected to said magnetic coil, a permanent rod-like magnet partly secured within said tube, and an armature normally held within the magnetic influence of said coil but located below said permanent magnet, said magnet and armature arranged to provide visual indicating means extending below said insulating tube when the current flow through said coil is reversed from the normal desired direction.

7. An electromagnetic device of the pivotless type for indicating a desired normal direction of current flow comprising an insulating tube, a magnetic coil surrounding said insulating tube, a metallic cap secured to both ends of said tube, each of said caps being electrically connected to said magnetic coil, a permanent rod-like magnet adjustably located within said tube, and an armature normally held within the magnetic influence of said coil but located below said permanent magnet, said magnet and armature arranged to provide visual indicating means extending below said insulating tube when the current flow through said coil is reversed from the normal desired direction.

8. A device for indicating direction of flow in a circuit comprising a permanent magnet, an armature normally influenced by the magnetic field of said permanent magnet to assume a normal position relative to said permanent magnet, a winding surrounding said armature which produces a field aiding the magnetic field of said permanent magnet when current flows in a normal desired direction through said winding, and also a magnetic field opposing the field of said permanent magnet when the current flows in a reversed direct from the normal desired direction so as to cause said armature to take a different position relative to said magnet, means for preventing said armature from assuming a different position when a fluctuation is caused momentarily in said winding, said means comprising a single turn member magnetically coupled to said permanent magnet armature and coil, and an indicator secured to said armature to indicate when the current flows in a reversed direction through said winding surrounding said armature.

JAMES W. CONKLIN.
CLARENCE W. HANSELL.